R. B. PRICE.
MANUFACTURE OF TIRES.
APPLICATION FILED APR. 9, 1913.
1,235,052.
Patented July 31, 1917.
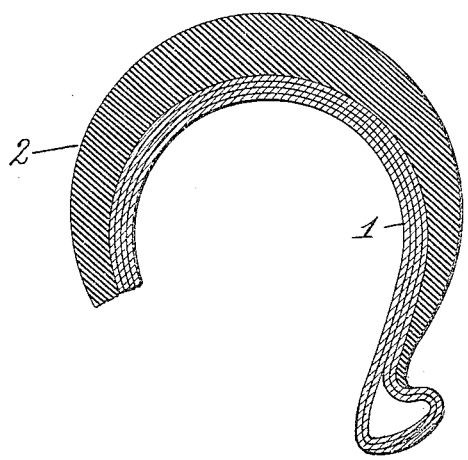
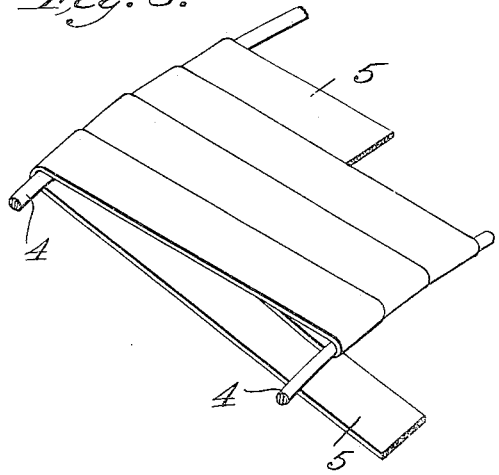
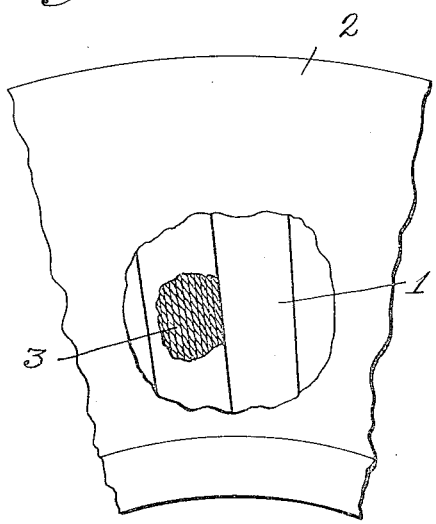
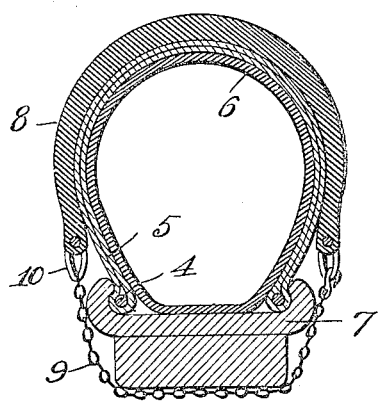
Witnesses
Edwin L. Jewell
A. L. Mills
Inventor
Raymond B. Price
By Percy B. Hills
Attorney

UNITED STATES PATENT OFFICE.

RAYMOND B. PRICE, OF NEW YORK, N. Y., ASSIGNOR TO RUBBER REGENERATING COMPANY, A CORPORATION OF INDIANA.

MANUFACTURE OF TIRES.

1,235,052.

Specification of Letters Patent.

Patented July 31, 1917.

Application filed April 9, 1913. Serial No. 759,946.

*To all whom it may concern:*

Be it known that I, RAYMOND B. PRICE, a citizen of the United States, residing in the borough of Manhattan, city of New York, State of New York, have invented new and useful Improvements in the Manufacture of Tires, of which the following is a specification.

My invention relates to the manufacture of tires, and has for its object to provide an improved construction of the same whereby an increase in the flexibility thereof will be obtained without impairing the strength.

A preferred manner of accomplishing this result is to build up a tire or tire shoe of strips of fabric cut preferably on the straight, said strips being frictioned with rubber and vulcanized before said strips are embodied in the tire or tire shoe. The rubber tread is then applied thereto, and the whole vulcanized in any desired manner, and for this purpose the outer ply of the fabric may be frictioned, but without preliminary vulcanization or may be coated with cement to obtain the necessary cohesion.

In the accompanying drawing:

Figure 1 is a transverse sectional view of a tire shoe embodying one form of my improved construction.

Fig. 2 is a detail side elevation, partly broken away, of the same.

Fig. 3 is a perspective view showing one method of winding the fabric or tape.

Fig. 4 is a view similar to Fig. 1 showing a tire and its rim made up from the fabric or tape shown in Fig. 3, and with a detachable cover.

In the said drawing, referring more particularly to Figs. 1 and 2, the fabric 1 is formed as hereinbefore described of strips, cut preferably straight, which have been previously frictioned with rubber and separately vulcanized. When said strips are thus embodied in the tire shoe, and the tread 2 applied thereto and vulcanized, it will be found that there is provided a freedom of motion between the plies of the fabric affording a flexibility impossible to obtain where the vulcanization is done only after the elements of the tire have been assembled.

In Fig. 2 the warp threads 3 of the fabric strips 1 are shown disposed radially, as are the strips 1 themselves. And, when so disposed either radially or diagonally the tread portions thereof may be prevulcanized and their ends left raw, which would insure their being more effectually vulcanized into the beads of the tire.

While I prefer to apply said strips radially, I may, if desired, apply the same diagonally, spirally or in any other suitable manner. Thus, the fabric of the tire may be built up of the usual plies in the usual manner, but with some or all of said plies prevulcanized. Or I may employ separate threads in place of the fabric strips, said threads having been frictioned and vulcanized before they are incorporated in the tire. In fact, the character of the fabric threads or other material employed, and their manner of application, may be varied at will, the essential feature being the prevulcanization thereof to provide for freedom of movement between the plies or layers of the same to increase the flexibility of the tire.

In Figs. 3 and 4 I have illustrated a method of forming the fabric portion of the tire, in which two loops 4 are employed, the same being spaced far enough apart so that, when wound spirally with an ordinary tape 5, as shown, an inner tube 6 can be placed between said hoops when the latter are positioned on the rim 7, and when inflated will shape said spirally wound tape to the configuration of a tire shoe, over which may be disposed a tire cover 8 of any desired construction, the latter being retained in position in any suitable manner, as by chains 9 engaging at their ends with loops 10 in the edges of said cover. Or a cover may be vulcanized onto this tape, the outside surface of the latter being provided with raw rubber or coated with cement to obtain the necessary cohesion. Nor do I confine myself to a spiral disposition of the tape, as the same may be disposed in strips radially, diagonally or otherwise.

I also contemplate winding the tape on a sectional former or core of substantially the shape of the completed tire, instead of on the hoops 4, and the same, as well as the winding shown in Fig. 3, may be done by hand or by machinery.

I also contemplate the use of plain strips, or cords or tape, without the use of rubber at all, and with or without a lubricant or waterproofing treatment.

I also contemplate using a single layer or ply of cords, tape or strips of either rubbered or lubricated or plain or waterproofed fiber, fastened in any suitable manner at the rim, adjacent elements being comparatively free to move in relation to each other.

Having thus described my invention, what I claim as new and desire to secure by Letters Patent is:

1. A tire embodying as the carcass thereof layers of fibrous material extending about the casing in transverse strands, said strands being unconnected transversely, whereby relative movement is permitted between them during the flexing of the tire.

2. A tire embodying as the carcass thereof layers of fibrous material extending about the casing in transverse strands, said strands being unconnected transversely on the tread portions, whereby relative movement is permitted between them during the flexing of the tire.

3. A tire embodying as the carcass thereof layers of fibrous material extending in strip form above the casing from edge to edge, said strips being unconnected transversely on the tread portions whereby relative movement is permitted between them during the flexing of the tire and vulcanized together at the bead portions.

4. A tire comprising a layer of fibrous material extending about the casing in transverse strands, a tread vulcanized to the upper surface of said layer and a second layer of fibrous material beneath said first layer extending about the casing in transverse strands, the strands of said second layer being unconnected transversely from each other and from the strands of the first layer on the tread portions, whereby relative movement is permitted between the layers and between the strands of said second layer during the flexing of the tire.

In testimony whereof, I have hereunto set my hand in the presence of two subscribing witnesses.

RAYMOND B. PRICE.

Witnesses:
CHARLOTTE M. SCHULE,
MAY V. SMITH.